United States Patent [19]

Grandclement

[11] Patent Number: 4,753,404
[45] Date of Patent: Jun. 28, 1988

[54] TUBE POSITIONING DEVICE

[75] Inventor: Gérard Grandclement, Cap D'Ail, France

[73] Assignee: S.A.M. INNOGE, Principaute De Monaco, Monaco

[21] Appl. No.: 894,258

[22] Filed: Aug. 7, 1986

[30] Foreign Application Priority Data

Aug. 12, 1985 [MC] Monaco ................................ 1789

[51] Int. Cl.$^4$ ................................................ F16L 3/22
[52] U.S. Cl. .................................... 248/68.1; 52/729; 248/73; 403/391
[58] Field of Search ............... 248/68.1, 69, 73, 65, 248/67, 49, 53; 52/729, 731, 36, 220; 206/443; 403/391, 390, 389; 283/137.1

[56] References Cited

U.S. PATENT DOCUMENTS

| | | | |
|---|---|---|---|
| 3,183,025 | 5/1965 | Lynch et al. | 403/390 |
| 3,434,682 | 3/1969 | Nestlerode | 248/68.1 |
| 3,437,297 | 4/1969 | Jirka et al. | 248/68.1 |
| 3,562,970 | 2/1971 | Schwartz | 52/729 X |
| 4,065,904 | 1/1978 | Taylor et al. | 52/731 |
| 4,306,697 | 12/1981 | Mathews | 248/68.1 |
| 4,344,480 | 8/1982 | Boyer et al. | 248/68.1 X |

Primary Examiner—Ramon O. Ramirez
Attorney, Agent, or Firm—Frishauf, Holtz, Goodman & Woodward

[57] ABSTRACT

Equipment for positioning at least two pipes for connecting their ends includes at least one elongated bar of a non-circular cross section, and a plurality of plates arranged on the elongated bar and slidable on the bar in direction of its elongation, while each of the plates has edges provided with a plurality of scallop shapes of different curvatures corresponding to respective pipe diameters.

13 Claims, 3 Drawing Sheets

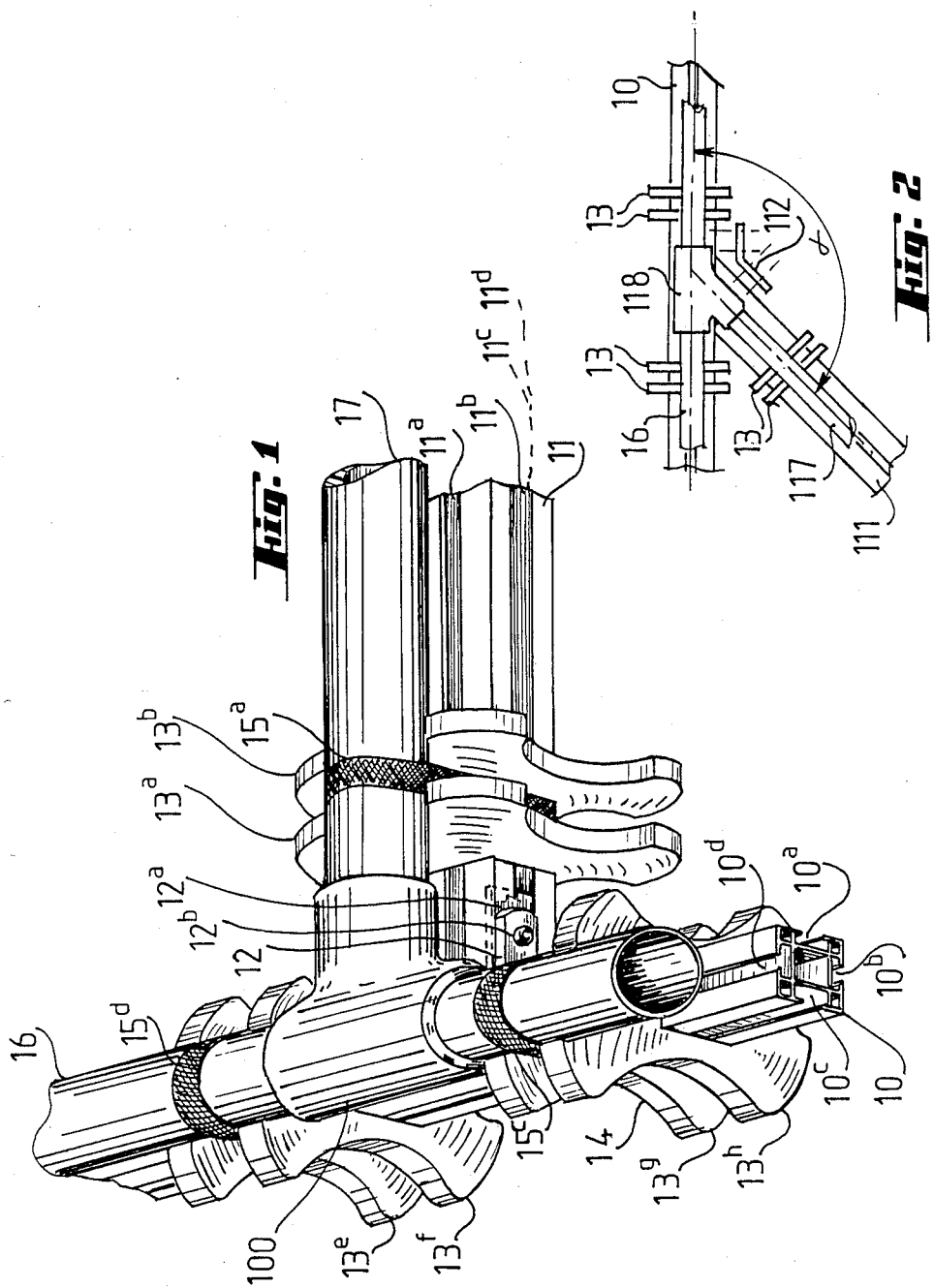

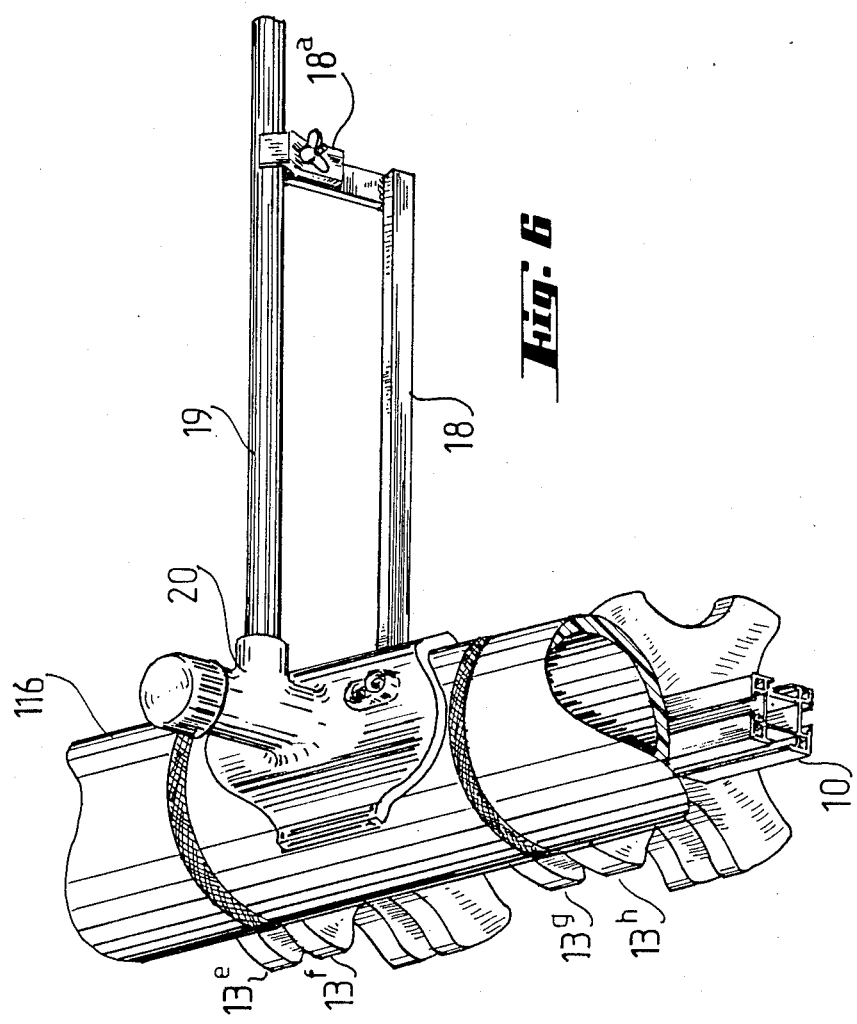

TUBE POSITIONING DEVICE

This invention concerns a tube positioning device, especially designed for gas pipes, which enables them to be assembled coaxially or so as to form branch pipes.

The equipment available at present is heavy and relatively difficult to use. It therefore presents a large number of disadvantages.

Firstly, it must be handled by specialised personnel and can generally only be implemented by a group of people as opposed to an individual.

Secondly, the multitude of pipe diameters available, along with the various possible connecting angles, poses a number of problems unsatisfactorily solved until now.

The invention aims at removing the disadvantages of previous equipment by proposing a device that enables easy positioning of the pipes in the various orientations for connection or branching, and which can be used by a single person on his own.

This is achieved with a device comprising essentially a bar of non-circular cross-section on which slide a number of plates. The edges of these plates comprise scallop shapes at intervals which have the same curvature as the possible diameters of the different pipes to be assembled.

Each pipe is positioned by placing it in these scallop shapes which therefore correctly orients it with respect to the bar. Any means of fixation can be used to immobilise the pipe in the scallop shape; for instance, a belt tightening device.

One particular version comprises bars of cross-section shaped like regular polygons, e.g.: squares. The edges of the plates are scalloped with one scallop per side of the polygon.

In the case of connection of two coaxial pipes, the bar is preferably in one piece with the plates mounted, sliding and supporting each pipe on each side of the joint. If the two pipes are of the same diameter, all the plate scallops are identical and the joint is a simple sleeve. In the case of different pipe diameters, the plates are oriented when positioned on the bar so as to present the scallops of appropriate diameter on each side of the joint, which in this case is a reducing sleeve.

In the case of connection of two coaxial pipes forming a given angle, the positioning device comprises a bar with support plates forming the desired angle with the main bar and its support plates. The bars are held together by means of brackets which slide in the grooves running the length of the bars.

In the case of transverse connection of one pipe to two other by means of a T-piece, the bars with their respective plates are arranged opposite the three ends of the joint and held in place.

In all cases, when the scallops in the plate edges are designed for pipes of different diameters, the geometric centers of the scallops are equidistant from the geometric center of the bar.

Finally, in the case of a branch connecting pipe, an additional piece comprising a fixing device is fitted to the bar supporting the plates and the main pipe.

If we now refer to the most complex case, i.e.: a lateral branching, the invention is implemented in three phases:

A bracket is fitted to the main bar that slides in the grooves and supports a secondary bar.

The pipe-supporting plates or disks are fitted on the main and secondary bars. The pipes are supported by means of support belts with tightening devices.

The joint is formed before actual welding.

According to one characteristic of the invention, the main bar and the connecting bar comprise grooves on each of their faces running the whole of their length.

These grooves enable the bracket connecting piece to be positioned by means of a tightening screw and counter plate in any appropriate position.

This connecting bracket can present all the angles required; preferably 90° or 45°.

The plates or disks are flat parts manufactured in light alloy or plastic material and comprise a hole at their center to enable them to fit over and slide on the bar. This hole is preferably non-circular to fix the plates in a certain orientation.

The plate edges are scalloped to position the pipe. They preferably comprise the same number of scallop shapes as there are different pipe diameters.

One version of the invention comprises plates with four scallop shapes of diameters 63, 90, 125 and 180 mm.

Other diameters can be provided for and, in the case of small diameters, the plate can be multipurpose, i.e.: comprise more than four scallop shapes.

The plates are preferably positioned in pairs with a space between the two plates of each pair to incorporate a tightening device; preferably a support belt with tightening device and rapid blocking and unblocking system.

The assembly preferably comprises four plates on the main bar and two on the secondary bar.

An additional part is provided in the case of branch pipe connecting to position the branch pipe. It comprises a bracket connected to the main bar by a tightening plate of the same type as the one used to connect the secondary bar. The bracket is fitted with a pincer system to fix the connecting pipe in position.

The characteristics and advantages of the invention will become evident from the description that follows which illustrates different examples of versions of the invention referring to the drawings in the appendix:

FIG. 1 is a perspective view of equipment according to the invention applied to the assembly of two pipes by means of a 90° T-piece;

FIG. 2 illustrates diagrammatically how the same equipment can be used to assemble the two pipes by way of a 45° (or 135°) connecting piece;

FIG. 6 represents one version of the equipment according to the invention which is used for connection of a lateral branch pipe.

Figure 3:
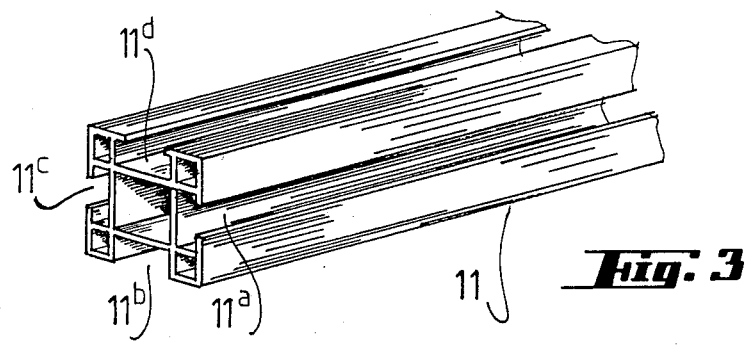
FIG. 3 is a perspective view of a bar, which is one of the main parts of the equipment according to the invention.
Figure 4:
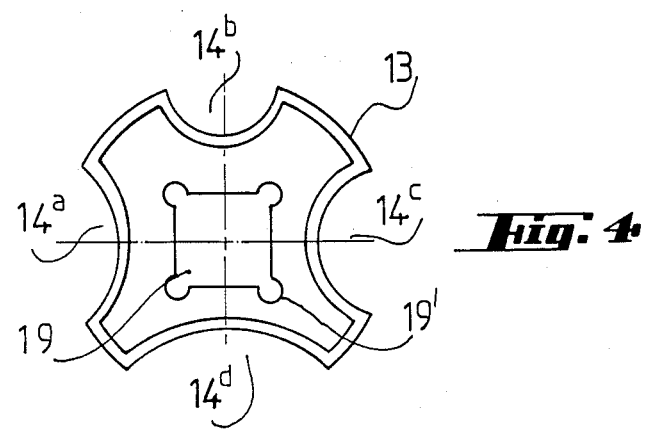
FIG. 4 is a front view of a plate, which is another main element of the equipment.

Considering firstly FIG. 1 (and FIGS. 3 and 4), in order to assemble pipes 16 and 17 by means of T-piece 100, the equipment comprises two bars 10 and 11, each conforming to FIG. 3, and a number of plates 13, each conforming to FIG. 4. These plates are oriented in terms of the diameter of the pipe to be assembled, as will be described in more detail in the following.

Each bar 10 or 11 comprises, as shown, longitudinal grooves (10*a*, 10*b* 10*c*, 10*d* and 11*a*, 11*b*, 11*c*, 11*d*). These are designed to enable sliding of the counter plates 12a used to fix the brackets 12 in position.

Each plate 13 comprises, as shown in FIG. 4, a central hole 19 which is approximatively the same shape and size as each of bar 10 and 11. The clearance 19' prevents the bar corners jamming in the hole.

An important feature of the invention is that the edges of each plate 13 comprise, opposite each of the sides of hole 19, scallop shapes 14a, 14b, 14c, 14d of different diameters corresponding to the most frequently encountered pipe diameters.

The equipment is implemented as follows:

The bars 10 and 11 are assembled by means of the brackets 12 held by screws 12b fixing them to the counter plates 12a, which are positioned as appropriate by sliding in the grooves of bars 10 and 11. A number of plates 13 are distributed over the length of bars 10 and 11 with their holes oriented so as to receive respectively pipes 16 and 17 of corresponding diameter. This ensures correct positioning of pipes 16 and 17 for their connection by means of connecting piece 100.

Belts 15a, 15b, 15c, 15d are placed around pipes 16 and 17 and their respective bars to immobilise the pipes on plates 13. The belts are tightened using any appropriate device, thus immobilising each pipe on each corresponding bar.

It is therefore possible to assemble pipes of four possible diameters with only a single set of plates. If we wish to increase the capacity of the equipment, several sets of plates can be used, thus multiplying the number of possible pipe diameters.

The different positioning operations described above are easily carried out by a single operator, who, after pipe asembly, can also easily recover the equipment by simply loosening the belts holding the pipes in place.

The bars and the plates, as well as the brackets and the counter tightening plates, can be manufactured in light alloy or other similar material which lightens the equipment without affecting its solidity. For example, certain plastic materials can be used.

Figure 5:
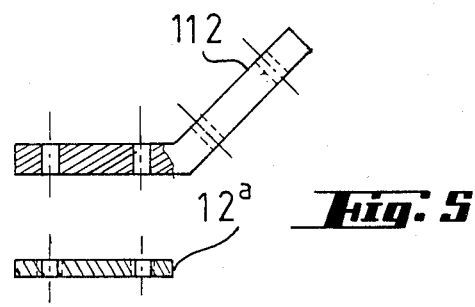
FIG. 5 shows an assembly bracket with its fastening plate.

From FIGS. 2 and 5, it can be seen that the same equipment can be used to assemble pipe 117 with pipe 16 by means of a connecting piece 118 forming an angle different to 90°. A main bar 10 and a secondary bar 111 are used along with the same plates 13. The only modification compared with the equipment as shown in FIG. 1 is the end of bar 111, which is cut at an angle, and plate 112 (FIG. 5), which is bent at the same angle.

Finally, considering FIG. 6, assembly of pipe 19 onto a branch connecting piece 20 (joined beforehand to pipe 16) uses the same bar 10 with plates 13e, 13f, 13g, 13h holding pipe 16 in place. Piece 18, forming part of bar 10 (by any appropriate means) and comprising a pincer device 18a, is used to hold pipe 19 in position.

It is obvious that in order to avoid the rotation of plates 13 about bar 11 so to preserve the alignment of scallop shapes 14 and, where appropriate, regularity of diameters of these scallop shapes the length of a bar, a cross-section of any shape for bar 11 can be used, with the exception of a circular one.

Finally, it should be noted that, in order to ensure positioning of the axes of the pipes to be connected in the same plane, in the case of scallop shapes 14 of different diameters, the geometric centers of all the scallop shapes must be equidistant from the geometric center of the bar (i.e. the bar axis).

What is claimed is:

1. Equipment for positioning at least two pipes for connecting their ends, characterized in that it comprises at least one elongated bar of a non-circular cross section; and a plurality of plates arranged on said elongated bar and adjustable along the length of said elongated bar in direction of its slidably elongation, each of said plates having edges provided with a plurality of scallop shapes of different curvatures corresponding to respective pipe diameters.

2. Equipment according to claim 1, characterized in that each pipe is immobilised in the plate scallop shapes by means of belts tightened thereto by tightening means.

3. Equipment according to claim 1, characterized in that the bars have cross-sections in the shape of regular polygons and the scallop shapes are distributed around the plate edges with one scallop shape per side of the polygon.

4. Equipment according to claim 3, characterized in that the polygons are squares.

5. Equipment according to claim 1, characterized in that there are two plates for each end of the pipes to be assembled.

6. Equipment according to claim 1, characterized in that the scallop shapes distributed over the different faces of each plate are designed for pipes of different respective diameters and that the geometric centers of these scallop shapes are equidistant from the geometric center of the bar.

7. Equipment according to claim 1, characterized in that in order to assemble two coaxial pipes with a connecting sleeve, the plates of the two pipes are supported by at least a single bar.

8. Equipment according to claim 1, characterized in that to assemble two non-coaxial pipes forming a given angle, the positioning device comprises a bar with supporting plates forming the desired angle with the main bar and its supporting plates wherein the bars are connected together by means of brackets sliding in respective longitudinal grooves on the bars.

9. Equipment according to claim 1, characterized in that it is designed for transverse connection of a pipe to two other pipes by means of a connecting T-piece, wherein bars with their respective plates are arranged opposite three ends of a connecting piece and held together thereat.

10. Equipment according to claim 1, characterized in that in the case of a branch pipe connection, an additional piece comprising a fixing plate is fitted to the bar supporting the plates and a main pipe.

11. Equipment according to claim 1, characterized in that each of said plates is provided with a guide of a non-circular cross-section formed so that each plate slides with said guide over said elongated bar in direction of its elongation.

12. Equipment according to claim 11, characterized in that said guide of each of said plates is formed as a non-circular opening located substantially in a center of a respective one of said plates.

13. Equipment according to claim 11, characterized in that said opening of each of said plates has a cross section which substantially corresponds to said non-circular cross-section of said bar, but also somewhat deviates from said non-circular cross section to provide a clearance between said bar and each of said plates.

* * * * *